(12) United States Patent
Gebbeken et al.

(10) Patent No.: US 10,966,365 B2
(45) Date of Patent: Apr. 6, 2021

(54) AGRICULTURAL MACHINE FRAME

(71) Applicant: LEMKEN GMBH & Co KG, Alpen (DE)

(72) Inventors: Martin Gebbeken, Alpen (DE); Dennis Bergerfurth, Rees (DE); Mark Berendsen, Lengel (NL); Marcel Geraats, Nettetal (DE); Christian Gotzen, Viersen (DE); Thomas Lukas, Ahaus-Wullen (DE); Christian Paessens, Issum (DE); Dieter Werries, Alpen (DE); Andreas Van Kann, Dahlem (DE); Clemens Diepers, Aldekerk (DE)

(73) Assignee: LEMKEN GMBH & CO KG, Alpen (DE)

( * ) Notice: Subject to any disclaimer, the term of this patent is extended or adjusted under 35 U.S.C. 154(b) by 58 days.

(21) Appl. No.: 15/771,475

(22) PCT Filed: Oct. 27, 2016

(86) PCT No.: PCT/DE2016/100505
§ 371 (c)(1),
(2) Date: Apr. 27, 2018

(87) PCT Pub. No.: WO2017/071691
PCT Pub. Date: May 4, 2017

(65) Prior Publication Data
US 2018/0310463 A1 Nov. 1, 2018

(30) Foreign Application Priority Data
Oct. 27, 2015 (DE) ..................... 10 2015 118 354.4

(51) Int. Cl.
*A01B 73/04* (2006.01)

(52) U.S. Cl.
CPC ................................ *A01B 73/044* (2013.01)

(58) Field of Classification Search
CPC .............................. A01B 73/044; A01B 73/04
USPC .................................................. 172/776, 311
See application file for complete search history.

(56) References Cited

U.S. PATENT DOCUMENTS

| 3,568,777 | A | * | 3/1971 | Hook | ..................... | A01B 63/00 |
| | | | | | | 172/316 |
| 3,637,027 | A | * | 1/1972 | Kovar | .................. | A01B 23/043 |
| | | | | | | 172/311 |
| 3,866,688 | A | * | 2/1975 | Hansen | ................ | A01B 73/044 |
| | | | | | | 172/311 |

(Continued)

FOREIGN PATENT DOCUMENTS

| DE | 3535683 A1 | 4/1986 |
| DE | 3543264 A1 | 6/1987 |

(Continued)

*Primary Examiner* — Thomas B Will
*Assistant Examiner* — Joel F. Mitchell
(74) *Attorney, Agent, or Firm* — The Watson IP Group, PLC; Jovan N. Jovanovic

(57) ABSTRACT

A hydraulically-foldable agricultural machine frame includes a hydraulic cylinder assembly that connects and pivots two lateral parts of the hydraulically-foldable agricultural machine frame relative to one another, wherein unrestricted pivoting or folding of the lateral parts is prevented by movement of the hydraulic cylinder assembly only being guided or delimited laterally.

9 Claims, 5 Drawing Sheets

(56) References Cited

U.S. PATENT DOCUMENTS

Figure 1:
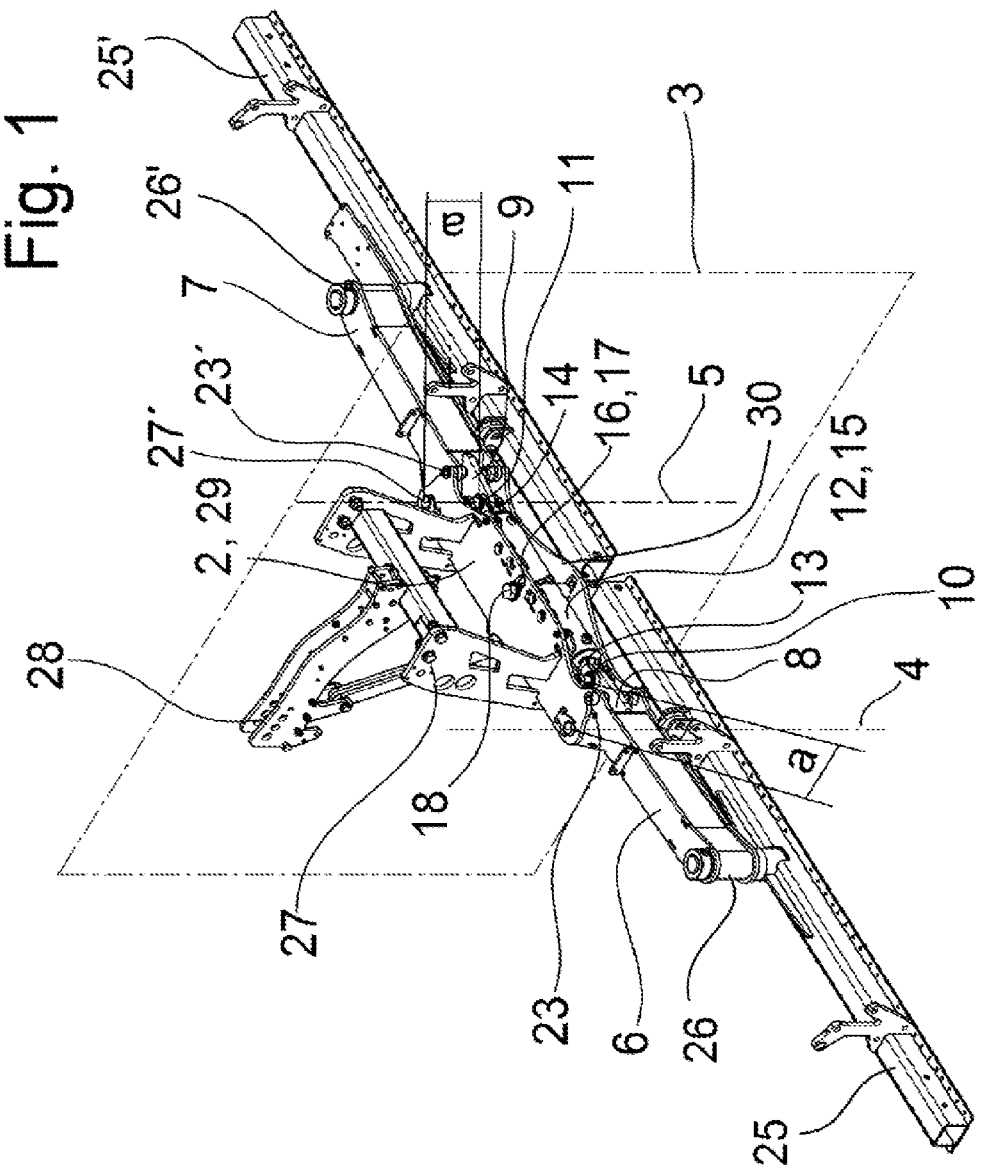

| | | | | |
|---|---|---|---|---|
| 3,866,689 | A | * | 2/1975 | Anderson ............ A01B 73/044 |
| | | | | 172/311 |
| 3,887,016 | A | * | 6/1975 | Hansen ................ A01B 73/044 |
| | | | | 172/311 |
| 3,967,684 | A | * | 7/1976 | Haverdink ........... A01B 73/046 |
| | | | | 172/311 |
| 4,031,965 | A | * | 6/1977 | Blair .................... A01B 73/044 |
| | | | | 172/311 |
| 4,033,427 | A | * | 7/1977 | Sturesson ................ B62D 5/26 |
| | | | | 180/424 |
| 4,316,511 | A | | 2/1982 | Koncernselskab |
| 4,505,349 | A | * | 3/1985 | Murphy ................ B62D 12/00 |
| | | | | 172/170 |
| 4,570,722 | A | * | 2/1986 | Osborn ................ A01B 73/044 |
| | | | | 172/311 |
| 4,825,958 | A | | 5/1989 | Kelderman |
| 4,867,245 | A | * | 9/1989 | Stevens ................ A01B 73/046 |
| | | | | 172/311 |
| 9,955,624 | B2 | * | 5/2018 | Sammut ............... A01B 73/067 |

FOREIGN PATENT DOCUMENTS

| | | |
|---|---|---|
| DE | 8816849 U1 | 12/1990 |
| DE | 20211893 U1 | 12/2002 |
| EP | 0878118 A1 | 11/1998 |
| EP | 1782669 A1 | 5/2007 |
| EP | 2020172 B1 | 10/2010 |
| GB | 1420401 A | 1/1976 |
| SU | 487602 A | 10/1975 |
| WO | 2012170548 A2 | 12/2012 |

* cited by examiner

AGRICULTURAL MACHINE FRAME

The invention relates to an agricultural machine frame according to the preamble of patent claim 1 for use in an agricultural machine. Such machine frames are readily used in soil cultivation devices or sowing machines, but also as a distributing rod assembly, for example, on a field sprayer. The machine frame thereby consists of a center part, which serves as a hitch or as an attachment on a vehicle or a running gear, as well as at least two lateral parts, which extend laterally from the center frame and can be folded from an extended working position into a compact transport position. The European patent specification EP 0 878 118 B1 describes the foldable machine frame of a rotary harrow for soil cultivation. On a center machine frame two booms are pivotably attached as lateral parts, on which in each case a rotary harrow half is suspended. About a pivot axis the two booms can in each case be hydraulically folded up by means of a hydraulic cylinder, which is movably arranged between the center frame and lateral part, from a wide, horizontal position, namely the working position, to a more narrow, vertical position, namely the transport position. The two hydraulic cylinders are thereby structurally integrated in the center frame, so that above the center frame other assemblies such as a gearbox or hopper can be arranged in a space-saving and compact manner. The PCT application WO 2012/170 548 also shows, for example, in FIG. 6 a machine frame of a soil cultivation machine with a center frame and lateral parts hinged thereon. By means of hydraulic cylinders, which mechanically connect only the lateral parts with one another in a cost-saving manner, both lateral parts can also be transferred from a horizontal working position into a vertical transport position. In contrast to the preceding patent specification, in which the pivoting movement is, of course, damped by hydraulic line resistances, in the present PCT application during a folding process a free and indefinite pivoting of the lateral part is possible, in that in the case of a somewhat angled position one lateral part falls down and the other is pulled upwards via the coupled hydraulic cylinder. Thus, machine damages and accidents can be caused.

The problem addressed by the invention is to provide a foldable, compact and cost-effective machine frame, which eliminates the previously mentioned disadvantages. This problem is solved by the features of the characterizing part of Claim 1.

By fixing the cylinder assembly in its lateral movement to the center frame the pivoting movement of the lateral parts takes place hydraulically damped via the cylinder assembly, which with its respective piston rods connects the right and left lateral parts with one another and through the piston movement causes the pivoting of the lateral parts. The absorption or support of the resulting, lateral damping forces thereby takes place in the center part by a limiting means, which is arranged between the center part and the cylinder assembly. Only one of six degrees of freedom of the cylinder assembly or its cylinder tube requires locking.

Advantageously, one hinges the cylinder assembly with at least one movable transverse control arm, known also as a Panhard rod (31), which is arranged hingedly between the center frame and the cylinder assembly. The active line runs thereby approximately parallel to the cylinder longitudinal axis, in order to reduce lateral cylinder movements relative to the center plane to a minimum.

In a further form of the invention the limiting means is depicted as a combination of a projection and a connecting-link, for example a pin or bolt, which runs in a elongate hole preferably vertically movably up and down.

If the lateral flanks of the stop connecting-link, which guide the pin or bolt, are formed non-parallel to the upright center plane of the center frame, for example, in an X-, diamond-, oval- or triangle shape, then the cylinder assembly depending on the lever configurations of the lateral parts can be applied depending on the end position with more or less lateral guide play, for example, with zero play in the transport position and an enlarged play in the working position, in order to make possible a relative movement of the lateral parts to the center part to compensate for terrain unevennesses. The stop projection and/or the stop connecting-link can be provided with elastic stop surfaces, in order to absorb bumps resiliently or in a damping manner.

Thereby at least one stop projection of the hydraulic cylinder assembly and the connecting-link is assigned to the center frame as a recess. The cylinder assembly can also be filled with at least one vertical groove, in which one or a plurality of pins or projections secured on the frame side engage and impede the cylinder assembly preferably without play in its movement laterally to the center plane.

By arrangement of the hydraulic cylinder assembly underneath the hinged axes of the center frame a free installation space is produced above the center frame, for example, for the arrangement of a gearbox or for containers for receiving operating substances of the agricultural devices or of items to be outputted. At the same time the hydraulic pressurization takes place for starting a folding movement on the piston head side, whereby in contrast to pulling cylinders, which are acted upon on the piston ring side, a smaller, space-saving and cost-effective piston- and cylinder diameter is required.

If one arranges an intermediate wall between the right and the left piston unit in the cylinder tube, then the movement of the piston units into the cylinder interior is limited symmetrically to a minimum installation dimension.

Preferably the intermediate- or center wall thereby protrudes at least partially elevated from the contour of the cylinder tube to form a projection, which together with a connecting-link of the center frame guides the cylinder assembly laterally. The reverse case is also conceivable in that the intermediate- or center wall is equipped with a groove and the center frame at least with one guide pin.

If one provides the center wall with further through-passages, preferably boreholes, the cylinder chambers can in the simplest manner be connected with one another or with externally located lines, in order to connect the hydraulic cylinder assembly to a pressure supply.

By installing further, preferably adjustable pivot stops defined end positions of the pivoting movements of the lateral parts are reached, wherein the hydraulic cylinder group may exceed minimum or maximum installation dimensions, which promotes a reuse in the modular system. At the same time the tolerance requirements of the limiting means are reduced for the lateral fixing of the cylinder assembly.

The invention is characterized in particular in that by installing a double piston cylinder between the pivot levers of a right and a left frame half, which in each case pivot about the center part of an agricultural machine frame, the piston forces within the cylinder assembly are largely mutually supported. A free, undefined striking back and forth of the right or left frame halves during the folding process is reliably prevented with low storage outlay by limiting the lateral movement of the cylinder assembly and its cylinder tube relative to the center part of the machine frame. In contrast to the rigidly fastened cylinder tube in the center part, which would move the lateral parts via further coupling tabs, the present hydraulic cylinder assembly remains nearly free of any radial forces, which strain the seals and piston guides.

Further details and advantages of the subject matter of the invention result from the following description and the associated drawings, in which an embodiment is depicted with the details and individual parts necessary for this purpose.

Figure 2:
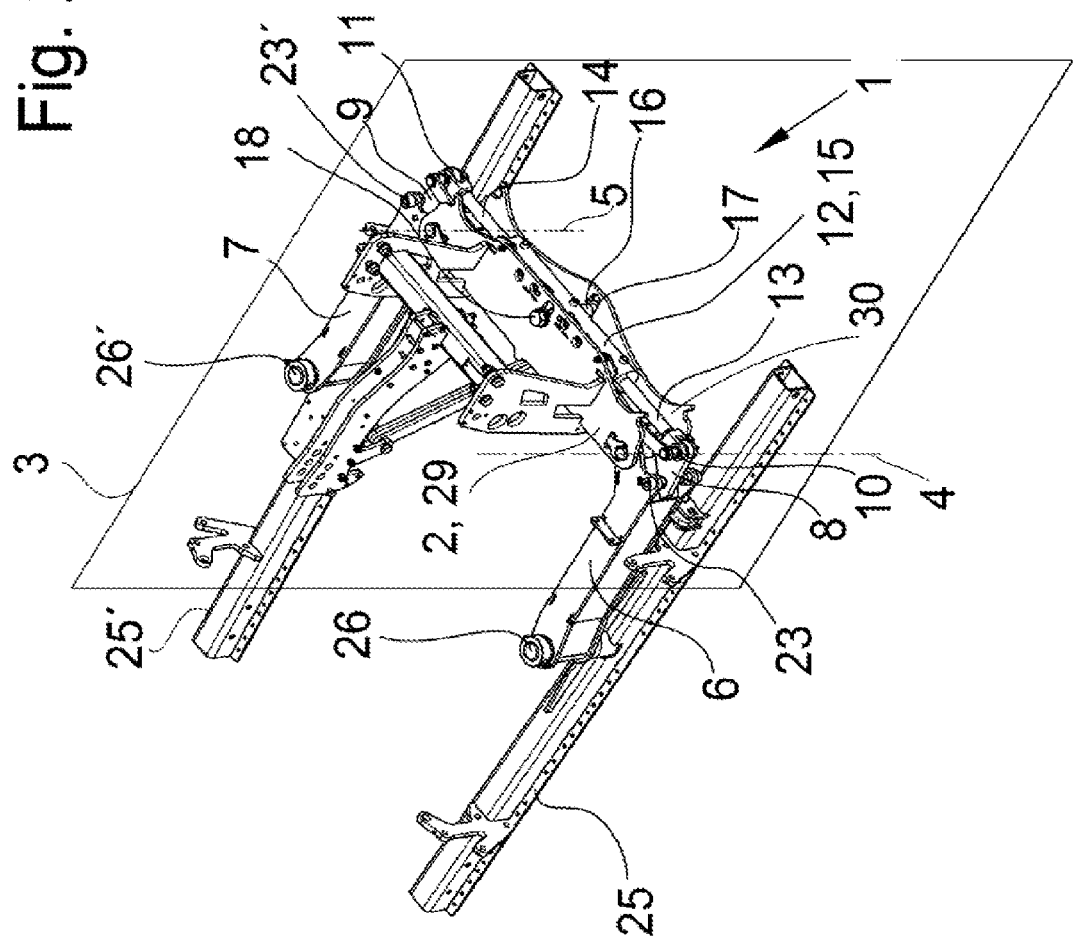
Figure 3:
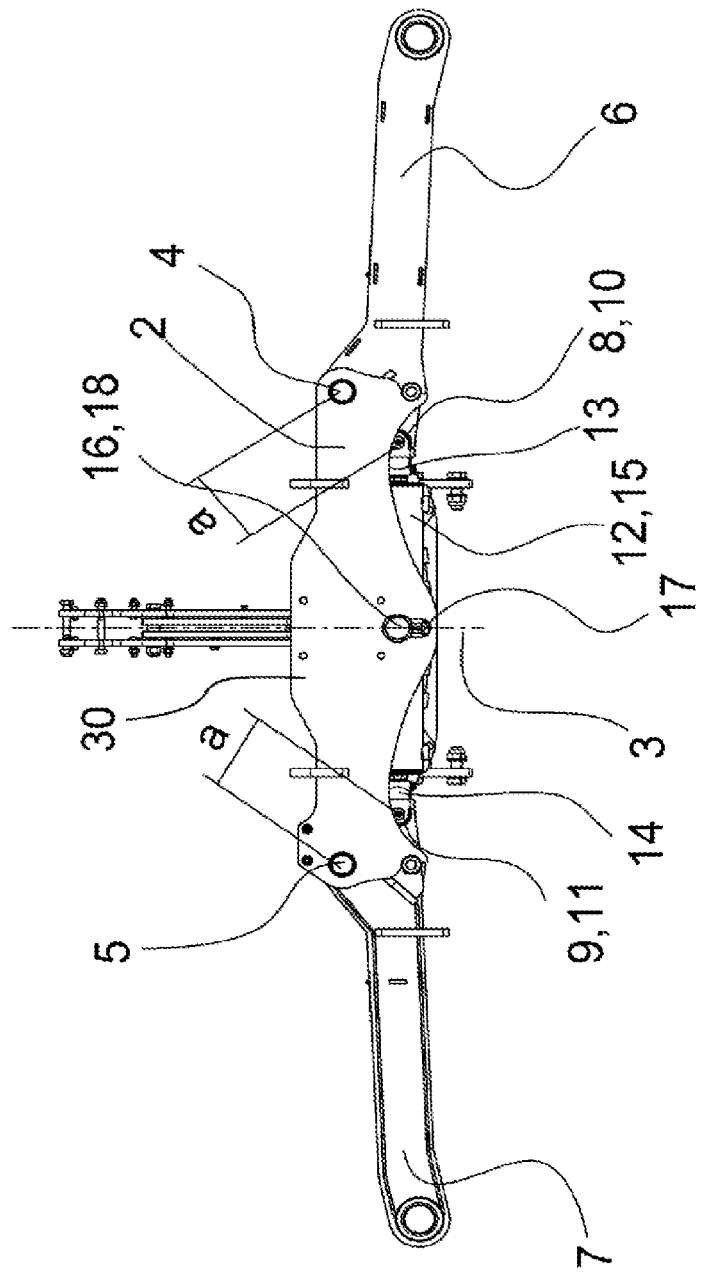
Figure 4:
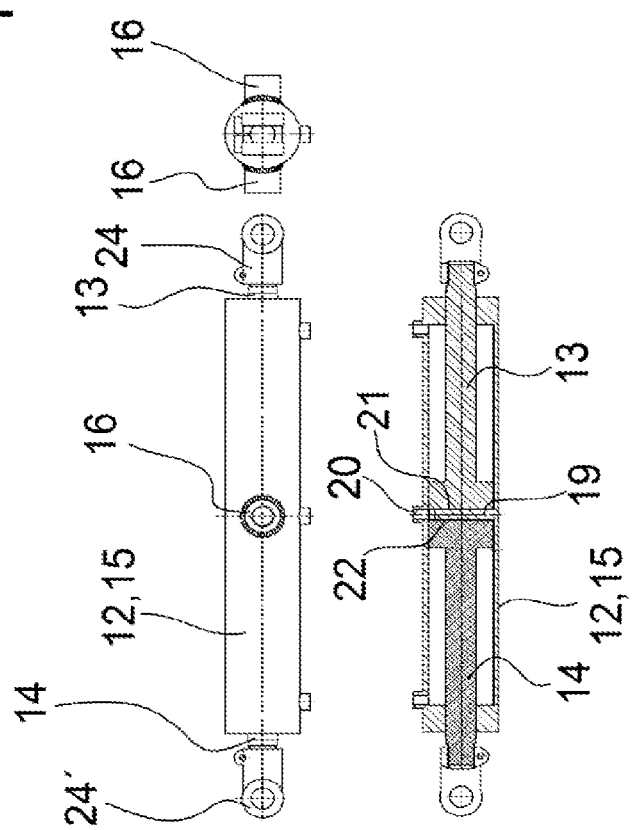
Figure 5:
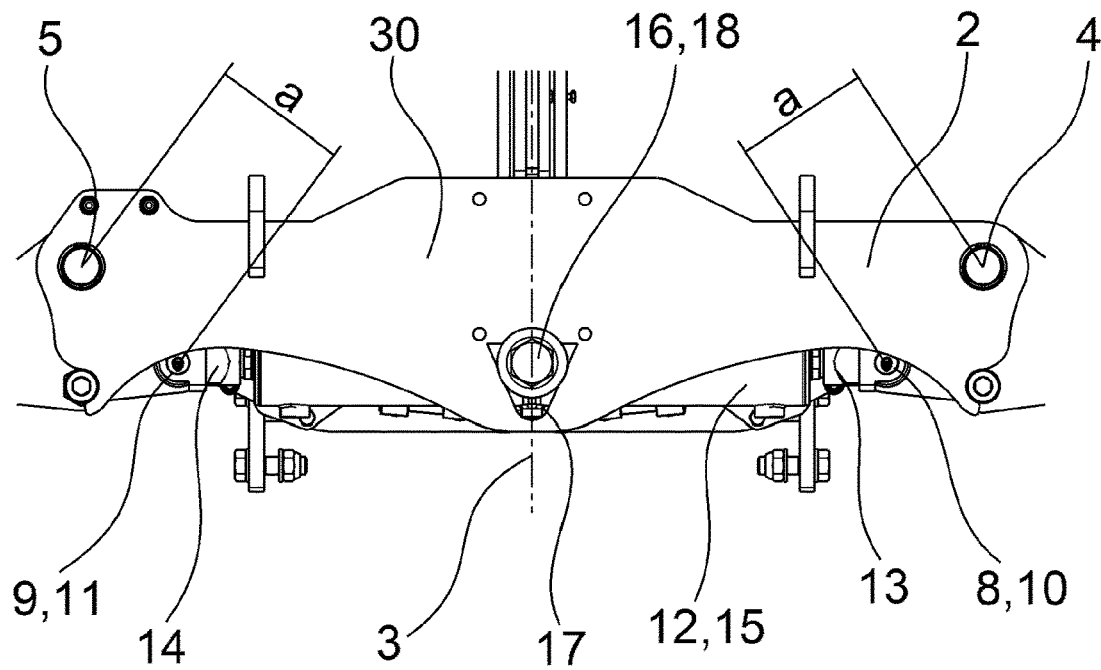
Figure 6:
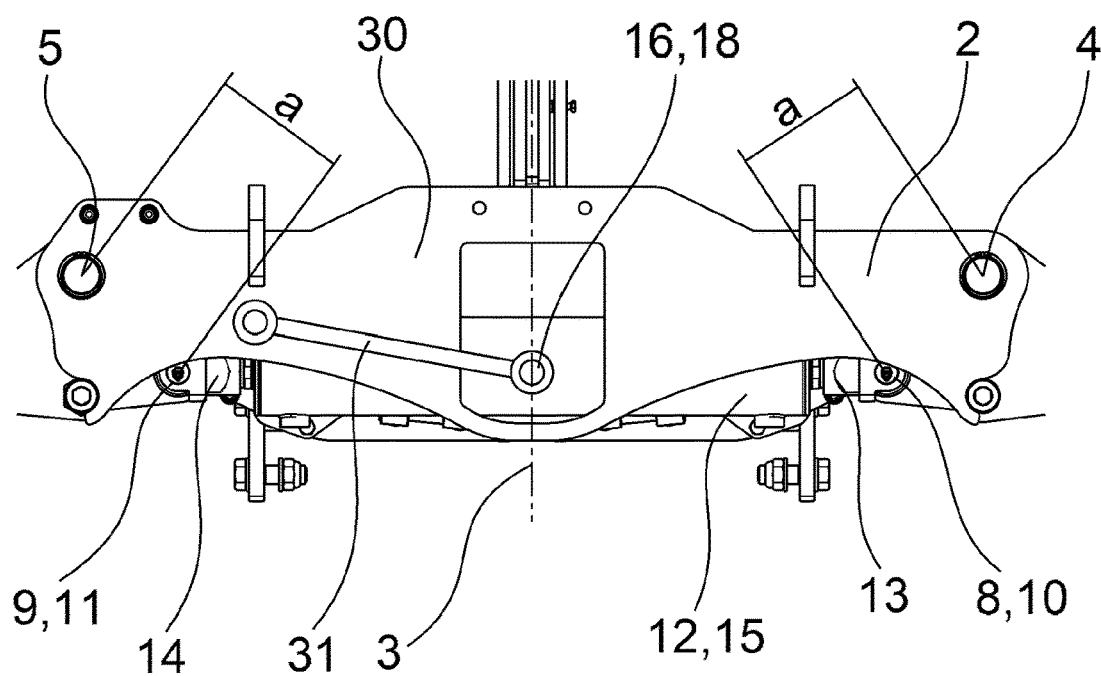

FIG. 1 shows an unfolded agricultural machine frame in the working position obliquely from the front below FIG. 2 shows the machine frame in the transport position from the same perspective FIG. 3 shows a rear view of the center part of the machine frame with adjoining side part FIG. 4 shows a basic design of the hydraulic cylinder assembly FIG. 5 shows walls of the stop connecting-link to the center plane FIG. 6 shows an embodiment of the disclosed limiting means

FIGURE DESCRIPTION

FIG. 1 shows an agricultural machine frame 1, as it can be used, for example, on soil cultivation devices, distribution- or sowing machines. A center frame designed nearly symmetrically to a center plane 3, also referred to as center part 2, is equipped with front installation points 27, 27' for reception in the lifting device of a vehicle as well as a further, upper pivot point 28 for the reception of a top link of the associated vehicle. Furthermore, the center part 2 consists of a front and a rear frame plate 29, 30, which is provided on the right and left with through-passages for the reception in each case of a hinge axis 4, 5, in which in each case a bolt is inserted. Via in each case a hinge axis 4, 5 right and left of the center plane 3 in each case a lateral part 6, 7 is pivotably articulated. An end stop 23, 23' limits the lower position of the lateral parts 6, 7 relative to the center part 2. On each lateral part 6, 7 a tab is welded underneath the hinge axes 4, 5 as lever 8, 9. The outer lever ends 10, 11 are provided at a distance a to the respective hinge axis 4, 5 with a borehole for the reception of a bearing bolt. The hydraulic cylinder assembly 12, consisting of a cylinder tube 15 and a piston unit 13, 14 protruding right and left, is located between the front and the rear frame plate 29, 30 of the center part 2. On the outer end of the piston unit 13, 14 in each case a fork head is screwed on, to which the piston unit 13, 14 is hingedly connected in each case with the lever 10, 11 by means of the previously mentioned bearing bolt. On the in each case outer ends of the lateral parts 6, 7 joints 26, 26' are arranged with fastening strips 25, 25' pivotably mounted therein. On the fastening strips 25, 25', which do not necessarily have to be pivotably mounted and which extend for example, over half the machine width of the agricultural device, soil cultivation application or sowing tools can be fastened at different distances. The arrangement of a rotary harrowing half, a mower or additional, further foldable lateral parts is also borne in mind. In the center of the cylinder tube 15 two threaded bushes are welded as stop projection 16, the center axis of which extends parallel to the center plane 3. The front and rear frame plates 29, 30 are in each case provided in the direction of the center plane 3 with an elongated hole as a through-passage, which forms the stop connecting-link 17. With a not visible spacer bush, a threaded bolt 18 is screwed from the outside through the elongated hole into the threaded bush and forms the entire stop projection 16, which with the elongated hole as stop connecting-link 17 guides the cylinder tube 15 vertically along the center plane 3 and prevents its lateral movement relative to the center plane 3.

FIG. 2 shows the same machine frame 1, as previously indicated in FIG. 1, however with hydraulically extended piston units 13, 14, which have pivoted the respective lateral parts 6, 7 about the respective hinge axis 4, 5 by means of the lever 8, 9 into the upper transport position. By further, not depicted stop means the fastening strips 25, 25' pivotable in each case about the joints 26, 26' are also locked and secured in an upright position. Further reference signs apply analogously to FIG. 1.

FIG. 3 shows again the basic design of the machine frame 1 from a horizontal view from the rear in the unfolded state. The rear frame plate 30 of the center part 2 is depicted with its right and left hinge axes 4, 5, in which the right and left lateral parts 6, 7 are suspended. The distance a between the respective hinge axis 4, 5 and the associated lever ends 10, 11 defines the effective lever distance for the hydraulic cylinder assembly 12 for performing the pivot movement of the respective lateral part 6, 7. In the depicted unfolded state the clear distance of the lever ends 10, 11 to one another is smaller than the distance of the hinge axes 4, 5 to one another, in the folded state according to FIG. 2 larger. Were the hydraulic cylinder assembly 12 arranged above the hinge axes 4, 5, the inverse distance ratios apply. Visible from the rear on the frame plate 30 is its elongated hole through-passage as stop connecting-link 17, in which the cylinder assembly 12 or the cylinder tube 15 can move by means of the stop projections 16 or the bolts 18 freely along the center plane 3, however guided laterally to the latter.

FIG. 4 shows the basic design of the hydraulic cylinder assembly 12. The cylinder tube 15 is subdivided into two halves by the center wall 19. In both tube halves in each case a piston unit 13, 14 with a respective piston head 21, 22 moves, an adjoining piston rod with in each case fork heads 24, 24' located outside as a hinge connection to the respective lateral parts. The piston units 13, 14 are sealed on the end side of the cylinder tube and secured against falling out. The center wall 19 is provided with a through-passage 20, which extends in the right and left cylinder halves and in addition leads outwards to a connection for a hydraulic pressure supply. If the through-passage 20 is subjected to hydraulic pressure, the two piston units 13, 14 move outwards. If the through-passage is relieved of pressure, the two piston units are pressed inwards by the gravitational force of the lateral parts or by pressurization of the piston ring sides via the externally located line connections. With a single pressure connection to the cylinder a pivoting movement can be set in motion in a single-acting manner. Instead of a single through-passage 20 two separate through-passages can independently lead into the respective cylinder halves. Thus, the two piston units 13, 14 can be activated individually and independent of one another. In the center on the cylinder tube 15 the stop projections 16 can be welded as threaded bushes.

Instead of hydraulic cylinders other control elements can also be used passively or actively.

If one transforms the described frame system about one of its main axes, the system can also be used horizontally.

Reference signs not cited can be used analogously to the other figures and their descriptions.

| LIST OF REFERENCE SIGNS | |
| --- | --- |
| 1 | machine frame |
| 2 | center part |
| 3 | center plane |
| 4 | hinge axes |
| 5 | hinge axis |
| 6 | lateral part |
| 7 | lateral part |
| 8 | lever |
| 9 | lever |
| 10 | lever end |
| 11 | lever end |
| 12 | hydraulic cylinder assembly |
| 13 | piston unit |
| 14 | piston unit |
| 15 | cylinder tube |
| 16 | stop projection |
| 17 | stop connecting-link |
| 18 | bolt |
| 19 | center wall |
| 20 | through-passage |
| 21 | piston head |
| 22 | piston head |
| 23 | end stop |
| 24 | fork head |
| 25 | fastening strip |
| 26 | joint |
| 27 | installation point |
| 28 | installation point |
| 29 | frame plate |
| 30 | frame plate |

The invention claimed is:

1. An agricultural machine frame, comprising:
a center part which extends laterally right and left from an upright center plane of the agricultural machine frame;
wherein on a right and left end of the center part a respective hinge axis is arranged approximately parallel to the upright center plane and to the right and left of the center part at least in further right and left lateral parts that continue transversely to the center plane;
wherein the right and left lateral parts are connected with the center part and pivotable about the respective hinge axis;
wherein the right and left lateral parts are in a first, wide working position approximately parallel to one another and perpendicular to the upright center plane and in a second, narrower transport position approximately perpendicular to the upright center part and parallel to the upright center plane;
wherein the right and left lateral parts each have respective levers with respective outer ends which extends at a distance (a) to the respective hinge axis;
wherein the respective levers of the right and left lateral parts are hingedly connected on the respective outer ends of the respective levers to a hydraulic cylinder assembly arranged approximately transversely to the upright center plane;
wherein the hydraulic cylinder assembly comprises right and left piston units which are hingedly connected with the respective outer end of the levers and the right and left piston units being guided coaxially and displaceable to a limited extent in a cylinder tube and together with the cylinder tube form the hydraulic cylinder assembly, wherein the cylinder tube is prevented by a limiter from making a lateral movement to the upright center plane; and
wherein the hydraulic cylinder assembly is arranged underneath the hinge axes.

2. The agricultural machine frame according to claim 1, wherein the stop projection is coupled to the cylinder tube and the stop connecting-link is coupled to the center part, or vice versa.

3. The agricultural machine frame according to claim 1, wherein between the center part and the lateral parts further comprise end stops that are provided at a distance to the respective hinge axis, the end stops limiting end positions of respective pivoting movements of the center part and the lateral parts.

4. The agricultural machine frame according to claim 1, wherein the limiter is at least one Panhard rod, which hingedly connects the center part and the cylinder tube.

5. The agricultural machine frame according to claim 1, wherein the stop connecting-link relative to the upright center plane has non-parallel side walls.

6. An agricultural machine frame, comprising:
a center part which extends laterally right and left from an upright center plane of the agricultural machine frame;
wherein on a right and left end of the center part a respective hinge axis is arranged approximately parallel to the upright center plane and to the right and left of the center part at least in further right and left lateral parts that continue transversely to the center plane;
wherein the right and left lateral parts are connected with the center part and pivotable about the respective hinge axis;
wherein the right and left lateral parts are in a first, wide working position approximately parallel to one another and perpendicular to the upright center plane and in a second, narrower transport position approximately perpendicular to the upright center part and parallel to the upright center plane;
wherein the right and left lateral parts each have respective levers with respective outer ends which extends at a distance (a) to the respective hinge axis;
wherein the respective levers of the right and left lateral parts are hingedly connected on the respective outer ends of the respective levers to a hydraulic cylinder assembly arranged approximately transversely to the upright center plane;
wherein the hydraulic cylinder assembly comprises right and left piston units which are hingedly connected with the respective outer end of the levers and the right and left piston units being guided coaxially and displaceable to a limited extent in a cylinder tube and together with the cylinder tube form the hydraulic cylinder assembly, wherein the cylinder tube is prevented by a limiter from making a lateral movement to the upright center plane;
wherein the cylinder tube is interrupted by a center wall which is arranged between the right and left piston units and limits movement of the right and left piston units into the interior of the cylinder tube; and
wherein the center wall of the cylinder tube extends as stop projection outwards into a stop connecting-link of the center frame.

7. The agricultural machine frame according to claim 6, wherein the center wall of the cylinder tube is provided with at least one through-passage which hydraulically connects the cylinder tube between a piston head and the center wall with at least one of a connected hydraulic line and an opposite cylinder chamber between another piston head and the center wall.

8. An agricultural machine frame, comprising:
a center part which extends laterally right and left from an upright center plane of the agricultural machine frame;

wherein on a right and left end of the center part a respective hinge axis is arranged approximately parallel to the upright center plane and to the right and left of the center part at least in further right and left lateral parts that continue transversely to the center plane;

wherein the right and left lateral parts are connected with the center part and pivotable about the respective hinge axis;

wherein the right and left lateral parts are in a first, wide working position approximately parallel to one another and perpendicular to the upright center plane and in a second, narrower transport position approximately perpendicular to the upright center part and parallel to the upright center plane;

wherein the right and left lateral parts each have respective levers with respective outer ends which extends at a distance (a) to the respective hinge axis;

wherein the respective levers of the right and left lateral parts are hingedly connected on the respective outer ends of the respective levers to a hydraulic cylinder assembly arranged approximately transversely to the upright center plane;

wherein the hydraulic cylinder assembly comprises right and left piston units which are hingedly connected with the respective outer end of the levers and the right and left piston units being guided coaxially and displaceable to a limited extent in a cylinder tube and together with the cylinder tube form the hydraulic cylinder assembly, wherein the cylinder tube is prevented by a limiter from making a lateral movement to the upright center plane;

wherein the limiter forms of a stop projection which extends parallel to the upright center plane and is in contact or in operative connection with a stop connecting-link which impedes movement laterally of the stop projection to the upright center plane and leads approximately parallel to the upright center plane; and wherein the agricultural machine frame uses a single one of the cylinder tube, the right and left piston units being located below the respective hinge axis to push the right and left lateral parts upward using a single hydraulic line, the single cylinder tube being guided in a slotted link in the agricultural machine frame.

9. An agricultural machine frame, comprising:

a center part which extends laterally right and left from an upright center plane of the agricultural machine frame;

wherein on a right and left end of the center part a respective hinge axis is arranged approximately parallel to the upright center plane and to the right and left of the center part at least in further right and left lateral parts that continue transversely to the center plane;

wherein the right and left lateral parts are connected with the center part and pivotable about the respective hinge axis;

wherein the right and left lateral parts are in a first, wide working position approximately parallel to one another and perpendicular to the upright center plane and in a second, narrower transport position approximately perpendicular to the upright center part and parallel to the upright center plane;

wherein the right and left lateral parts each have respective levers with respective outer ends which extends at a distance (a) to the respective hinge axis;

wherein the respective levers of the right and left lateral parts are hingedly connected on the respective outer ends of the respective levers to a hydraulic cylinder assembly arranged approximately transversely to the upright center plane;

wherein the hydraulic cylinder assembly comprises right and left piston units which are hingedly connected with the respective outer end of the levers and the right and left piston units being guided coaxially and displaceable to a limited extent in a cylinder tube and together with the cylinder tube form the hydraulic cylinder assembly, wherein the cylinder tube is prevented by a limiter from making a lateral movement to the upright center plane, the limiter forms of a stop projection which extends parallel to the upright center plane and is in contact or in operative connection with a stop connecting-link which impedes movement laterally of the stop projection to the upright center plane and leads approximately parallel to the upright center plane; and wherein the agricultural machine frame uses a single one of the cylinder tube, the right and left piston units being located below the respective hinge axis to push the right and left lateral parts upward using a single hydraulic line, the single cylinder tube being guided in a slotted link in the agricultural machine frame.

* * * * *